US006556830B1

(12) United States Patent
Lenzo

(10) Patent No.: US 6,556,830 B1
(45) Date of Patent: Apr. 29, 2003

(54) COVERAGE AREA SECTORIZATION IN TIME DIVISION MULTIPLE ACCESS/ FREQUENCY-TIME DIVISION DUPLEX COMMUNICATIONS SYSTEMS

(75) Inventor: Michael J. Lenzo, Apex, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/241,407

(22) Filed: Feb. 2, 1999

Related U.S. Application Data

(60) Provisional application No. 60/073,334, filed on Feb. 2, 1998.

(51) Int. Cl.[7] .............................................. H04Q 7/20
(52) U.S. Cl. ...................... 455/450; 370/281; 370/509; 370/581
(58) Field of Search ................................ 455/446, 447, 455/561, 562, 422; 370/280, 281, 347, 252, 331, 276, 277, 278, 294, 295, 328, 330, 336, 337

(56) References Cited

U.S. PATENT DOCUMENTS

| | | | |
|---|---|---|---|
| 5,134,710 A | | 7/1992 | Akerberg .................. 455/54.1 |
| 5,307,507 A | * | 4/1994 | Kanai .......................... 455/447 |
| 5,444,696 A | | 8/1995 | Petranovich ................. 370/17 |
| 5,475,677 A | | 12/1995 | Arnold et al. ................ 370/29 |
| 5,581,548 A | * | 12/1996 | Ugland et al. ............... 370/330 |
| 5,594,720 A | * | 1/1997 | Papadopoulos et al. ...... 370/330 |
| 5,602,836 A | | 2/1997 | Papadopoulos et al. ...... 370/280 |
| 5,617,412 A | | 4/1997 | Delprat et al. ............... 370/281 |
| 5,649,292 A | * | 7/1997 | Doner .......................... 455/447 |
| 5,689,502 A | * | 11/1997 | Scott .......................... 370/281 |
| 5,732,076 A | | 3/1998 | Ketseoglou et al. ......... 370/347 |
| 5,920,819 A | * | 7/1999 | Asanuma ..................... 455/447 |
| 5,956,326 A | | 9/1999 | Magana ....................... 370/277 |
| 6,047,015 A | | 4/2000 | Watanabe et al. ............ 375/132 |
| 6,049,716 A | | 4/2000 | Jung ........................... 455/442 |
| 6,094,421 A | * | 7/2000 | Ugland et al. ............... 370/330 |
| 6,134,227 A | * | 10/2000 | Magana ....................... 370/330 |
| 6,151,512 A | * | 11/2000 | Chheda et al. .............. 455/562 |
| 6,154,661 A | * | 11/2000 | Goldburg ..................... 455/562 |
| 6,240,076 B1 | * | 5/2001 | Kanerva et al. ............. 370/330 |

FOREIGN PATENT DOCUMENTS

| | | |
|---|---|---|
| EP | 0720405 | 7/1996 |
| EP | 0899972 A2 * | 8/1998 |
| GB | 2306083 A * | 10/1996 |
| GB | 2306083 | 4/1997 |
| JP | 0899972 | 9/1999 |
| WO | WO 9721287 | 6/1997 |
| WO | WO 9723071 | 6/1997 |

OTHER PUBLICATIONS

"Digital Cellular Telecommunications System (Phase 2+); Multiplexing and Multiple Access on the Radio Path (GSM 05.02 Version 6.3.0 Release 1997)"; European Standard (Telecommunications Series), Global System for Mobile Communications, European Telecommunications Standards Institute, 1998.

"An Introduction to GSM;" Chapter 5, "The Physical Layer—Layer 1;" GSM, Redl, Weber and Oliphant, Artech House Publishers, ISBN 0–89006–785–6, 1995.

* cited by examiner

Primary Examiner—Dwayne Bost
Assistant Examiner—Joy K. Contee
(74) Attorney, Agent, or Firm—Myers Bigel Sibley & Sajovec

(57) ABSTRACT

Sectorization methods and apparatus provide full time and spectral coverage in wireless communications systems employing frequency-time division duplex formats. According to exemplary embodiments, a number of base stations are strategically positioned and configured using frequency-division duplex transceivers of different time-reference type so that a duplex link can be set up anywhere within the system coverage area during any available system time slot. Advantageously, the disclosed methods provide a high degree of adjacent sector interference immunity with relatively little hardware complexity.

19 Claims, 9 Drawing Sheets

Fig. 6
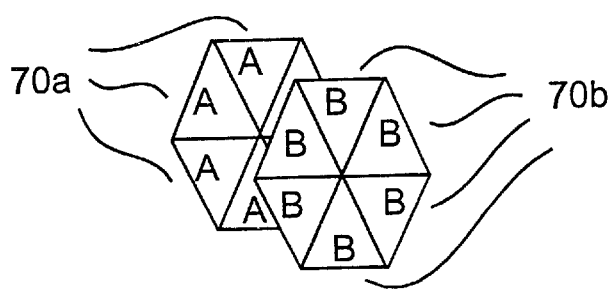
Basestation time reference definition
Fig. 7
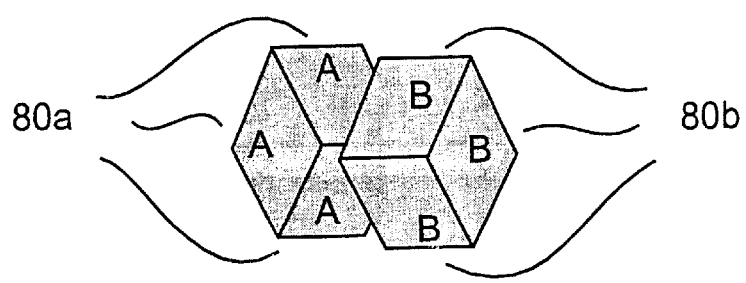
Fig. 8

COVERAGE AREA SECTORIZATION IN TIME DIVISION MULTIPLE ACCESS/ FREQUENCY-TIME DIVISION DUPLEX COMMUNICATIONS SYSTEMS

CROSS-REFERENCE TO RELATED APPLICATIONS

The present application claims the benefit of U.S. Provisional Application No. 60/073,334, filed Feb. 2, 1998, which is incorporated herein in its entirety by reference.

FIELD OF THE INVENTION

The present invention relates to communications systems, and more particularly, to the sectorization of cells, or coverage areas, in time division multiple access (TDMA) radio communications systems.

BACKGROUND OF THE INVENTION

Most time-division multiple-access wireless communications systems employ either a time-division duplex (TDD) scheme or a frequency-division duplex (FDD) scheme to separate uplink and downlink transmissions. Since both duplex schemes provide certain advantages and disadvantages, both schemes are routinely utilized in wireless communications applications.

For example, in the Personal Wireless Telecommunication (PWT) standard, time-division multiple-access with time-division duplex is used for frequency planning as well as signal packet and time slot assignment. Such a time-division multiple-access/time-division duplex scheme is well suited for many business wireless communication applications (e.g., small-campus systems with micro or pico cells).

On the other hand, time-division multiple-access with either time-division duplex or frequency-division duplex can be preferable for licensed Personal Communication Service (PCS) frequency bands, depending upon customer demands and marketplace requirements. In other words, since the structure of a Personal Communications Service system is primarily determined by a service provider having acquired a portion of the frequency spectrum, the technology and frequency usage implemented in such a system is ultimately driven by customer demand as well as legal and practical constraints. While a first customer may request a time-division multiple access/time-division duplex system for a particular business wireless application, a second customer may thereafter demand a time-division multiple access/frequency-division duplex system for a wireless local loop application.

Thus, product and service providers are often required to convert between duplex schemes. Converting between schemes, however, typically results in duplicated effort and therefore wastes significant time and resources. For example, since the conventional time-division duplex and frequency-division duplex schemes are fundamentally different, it generally is not feasible to use a common hardware platform for both types of system. As a result, two development teams are typically assigned, and two separate product lines are usually established, to provide for both time-division duplex and frequency-division duplex implementations.

To alleviate this problem, copending U.S. patent application Ser. No. 09/189,808, entitled "Flexible Frequency-Time Division Duplex in Radio Communications Systems" and filed Nov. 12, 1998, and copending U.S. patent application Ser. No. 09/189,807, entitled "Fixed Frequency-Time Division Duplex in Radio Communications Systems" and also filed Nov. 12, 1998, describe duplex schemes which allow a communications system to be adapted to satisfy varying customer needs without requiring modification of basic system hardware architecture. More specifically, the above cited copending applications describe mixed, or hybrid, division duplex mechanisms in which uplink and downlink transmissions can be separated in frequency while time slots associated with transmission and reception are also separated in time. The hybrid duplex schemes, referred to herein as frequency-time division duplex (FTDD), allow alternative division duplex mechanisms to be selectively implemented within a communications system without requiring modification of basic system hardware architecture. Each of the above cited copending utility applications is incorporated herein in its entirety by reference.

Advantageously, the disclosed frequency-time division duplex systems can utilize a single hardware platform for applications where either time-division duplex or frequency-division duplex is preferred. According to exemplary embodiments, the disclosed frequency-time division duplex systems are neither pure time-division duplex systems, in which the same frequency band is used for both uplink and downlink transmissions, nor pure frequency-division duplex systems in which both uplink and downlink transmissions occur simultaneously. Rather, the disclosed frequency-time division duplex systems can utilize separate frequency bands as well as separate time slots for uplink and downlink communications. Thus, a hardware platform initially designed for use in a timedivision multiple access/time-division duplex system can be readily adapted for use in a time-division multiple access/frequency-division duplex system, and vice versa, without significant hardware modification.

Furthermore, since uplink and downlink communications can be separated in both frequency and time, the disclosed frequency-time division duplex systems provide less cross-channel interference as compared to prior art systems. Also, since a single hardware path can be used for both uplink and downlink transmissions at both base stations and terminals, the disclosed frequency-time division duplex systems retain the advantages of low cost and power consumption typically associated with conventional time-division duplex systems. The disclosed frequency-time division duplex systems can also be configured to operate without loss of spectral efficiency. Further toward that end, the present invention provides methods and apparatus for providing coverage area sectorization in such frequency-time division duplex systems.

SUMMARY OF THE INVENTION

The present invention provides efficient sectorization methods for use with frequency-time division duplex communications systems. According to exemplary embodiments, a number of base stations within a communications system are strategically positioned and configured using frequency-division duplex transceivers of different time-reference type so that a duplex link can be set up anywhere within the system coverage area during any available system time slot. Advantageously, the disclosed methods provide a high degree of adjacent sector interference immunity with relatively little hardware complexity.

According to an exemplary embodiment, a base station cluster for use in a wireless communications system includes a number of base stations, each base station being configured to communicate with mobile stations in the wireless communications system and in accordance with a time division multiple access/frequency-time division duplex (TDMA/FTDD) communications format. The exemplary base station cluster includes an equal number of antennae, each antenna being coupled to a different one of the base stations and oriented such that each of the base stations communicates with mobile stations located in a sector of a coverage area serviced by the base station cluster. According to the embodiment, information signals are communicated between the base stations and mobile stations via TDMA frames, each TDMA frame including first and second time slot partitions. For example, each base station in the cluster can use the first partition of each TDMA frame exclusively for transmission of information signals to mobile stations while using the second partition of each TDMA frame exclusively for reception of information signals from mobile stations. Alternatively, a first subset of the base stations can use the first partition of each TDMA frame exclusively for transmission of information signals to mobile stations while using the second partition of each TDMA frame exclusively for reception of information signals from mobile stations, and a second subset of the base stations can use the first partition of each TDMA frame exclusively for reception of information signals from mobile stations and can use the second partition of each TDMA frame exclusively for transmission of information signals to mobile stations.

According to another exemplary embodiment, a wireless communications system having an overall coverage area with a plurality of cells includes at least one base station cluster positioned within one of the cells, each base station cluster including a number of base stations and an equal number of antennae. According to the embodiment, each base station can be configured to communicate with mobile stations in the wireless communications system and in accordance with a time division multiple access/frequency-time division duplex (TDMA/FTDD) communications format, and each antennae can be coupled to a different one of the base stations and oriented such that each of the base stations communicates with mobile stations located in a cell sector. For example, first and second base station clusters can be co-located in one cell, wherein each base station in the first base station cluster uses the first partition of each TDMA frame exclusively for transmission of information signals to mobile stations and uses the second partition of each TDMA frame exclusively for reception of information signals from mobile stations, and wherein each base station in the second base station cluster uses the first partition of each TDMA frame exclusively for reception of information signals from mobile stations and uses the second partition of each TDMA frame exclusively for transmission of information signals to mobile stations. Alternatively, a single base station cluster can be located in a cell, wherein each of a first subset of base stations in the single base station cluster uses the first partition of each TDMA frame exclusively for transmission of information signals to mobile stations and uses the second partition of each TDMA frame exclusively for reception of information signals from mobile stations, and wherein each of a second subset of base stations in the single base station cluster uses the first partition of each TDMA frame exclusively for reception of information signals from mobile stations and uses the second partition of each TDMA frame exclusively for transmission of information signals to mobile stations.

The above-described and other features and advantages of the invention are explained in detail hereinafter with reference to the illustrative examples shown in the accompanying drawings. Those of skill in the art will appreciate that the described embodiments are provided for purposes of illustration and understanding and that numerous equivalent embodiments are contemplated herein.

BRIEF DESCRIPTION OF THE DRAWINGS

FIG. 6 is a table defining an exemplary reference timing arrangement for two groups of base stations according to the invention.

FIG. 7 depicts a first exemplary frequency-time division duplex sectorization approach according to the invention.

FIG. 8 depicts a second exemplary frequency-time division duplex sectorization approach according to the invention.

DETAILED OF THE INVENTION

Figure 1:
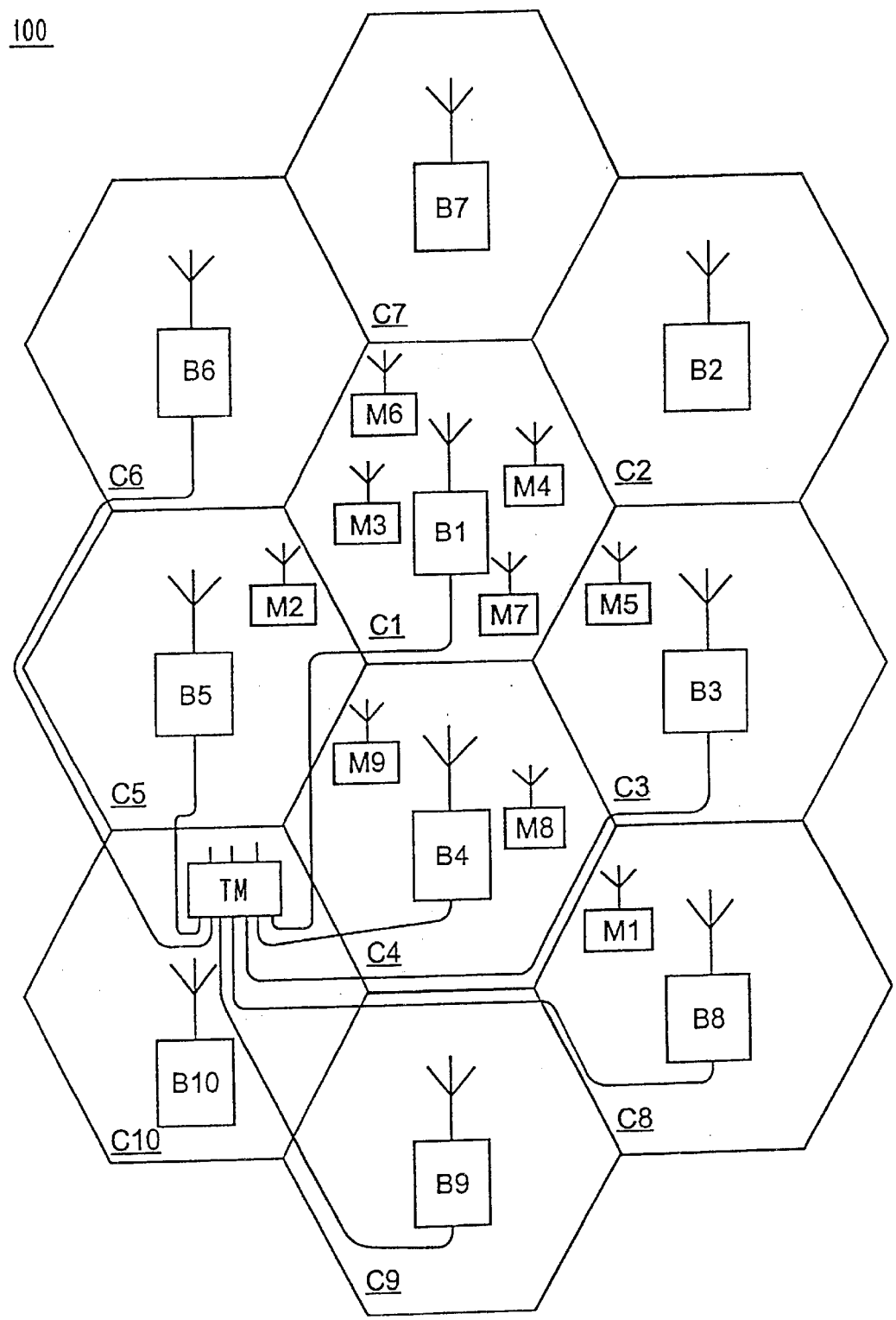
FIG. 1 depicts an exemplary wireless communications system in which the teachings of the invention can be implemented.

FIG. 1 depicts a wireless communications system 100 in which the teachings of the present invention can be implemented. As shown, the exemplary wireless system includes ten cells or coverage areas C–C10, ten base stations B1–B10, a timing master TM and ten mobile stations M1-M10. Such a wireless system can be constructed, for example, in accordance with the Personal Wireless Telecommunication (PWT) standard, and can therefore be used, for example, to provide mobile communications within a building or throughout a campus including many buildings and open areas. Generally, a wireless system can include far more than ten cells, ten base stations and ten mobile stations; however, ten of each is sufficient for illustrative purposes.

As shown, one or more base stations can be situated in each of the cells. Although FIG. 1 shows the base stations located toward the cell centers, each base station can instead be located anywhere within a cell. Base stations located toward a cell center typically employ omni-directional antennas, while base stations located toward a cell boundary typically employ directional antennas. The timing master TM, or radio exchange, maintains timing synchronization between the base stations as is known in the art. The timing master can be connected to the base stations by cable, radio links, or both.

Each base station and each mobile station includes a transceiver for transmitting and receiving communications signals over the air interface. Typically, the base and mobile stations communicate using a form of time, frequency or code division multiple access (i.e., TDMA, FDMA or CDMA) as is known in the art. As the mobile stations move within a cell and from cell to cell, communication with at least one base station is always possible. As a result, mobile station users are able to place, receive and conduct calls anywhere within the overall system coverage area.

To illuminate the features and advantages of the frequency-time division duplex (FTDD) sectorization schemes of the present invention, conventional time-division duplex (TDD) and frequency-division duplex (FDD) schemes are described hereafter with respect to FIGS. 2A, 2B, 3A and 3B. Without loss of generality, the channel definition in the Personal Wireless Telecommunication standard is used to illustrate a conventional time-division multiple-access (TDMA)/TDD system. Although channel definitions can differ between standards, the underlying multiplexing and duplexing concepts remain the same.

Figure 2A:
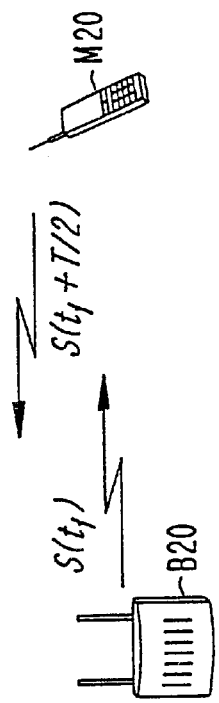
FIG. 2A depicts a base station and a terminal communicating in accordance with a conventional time-division multiple-access/time-division duplex scheme.
Figure 2B:
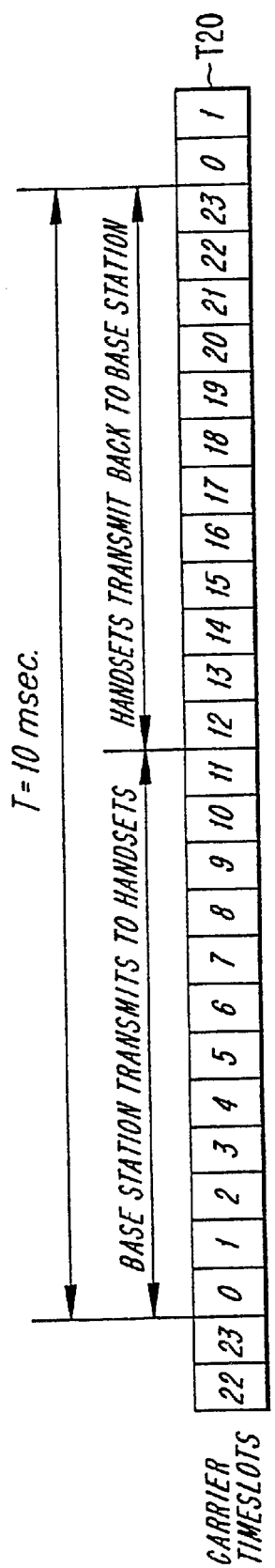
FIG. 2B depicts an exemplary time slot arrangement in a conventional time-division multiple-access/time-division duplex system.

FIG. 2A depicts uplink and downlink communication according to a conventional TDD scheme. As shown, signals transmitted from a TDD base station B20 to a TDD handset M20, and those transmitted from the TDD handset M20 to the TDD base station B20, are separated in time. If, as shown in FIG. 2B, a predetermined time interval T represents the duration of a single TDMA/TDD frame T20, then the separation between uplink and downlink transmissions is typically one half of the predetermined time interval T, or T/2. In a Personal Wireless Telecommunications system, each frame is 10 milliseconds in duration and includes twenty-four data slots. Within a data frame, twelve time slots are used for transmission (from the TDD base station B20 to the TDD handset M20), and the remaining twelve time slots are used for reception (i.e., transmission from the TDD handset M20 to the TDD base station B20). Though transmissions and receptions are separated by certain fixed (or variable) time, they share a common frequency band. The channel of such a system is therefore defined by a predetermined frequency and time reference pair.

Such TDMA/TDD systems are widely adopted in various wireless communications applications. An advantage of these systems is that of frequency efficiency, as both uplink and downlink transmissions use a common frequency carrier. Additionally, since transmissions and receptions are separated in time, a single hardware path (including filters, local oscillators, etc.) can be used for both functions. As a result, TDD systems are relatively low cost. Also, since receiving hardware can be turned off during transmission (and transmitting hardware can be turned off during reception), TDD systems consume relatively little power.

Figure 3A:
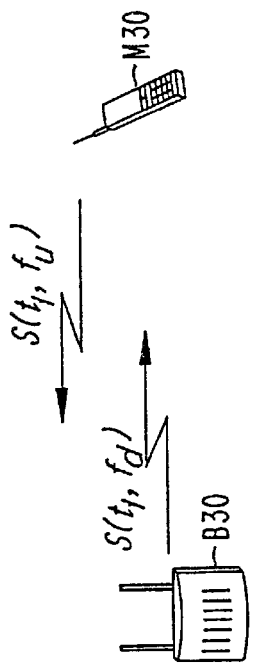
FIG. 3A depicts a base station and a terminal communicating in accordance with a conventional time-division multiple-access/frequency-division duplex scheme.
Figure 3B:
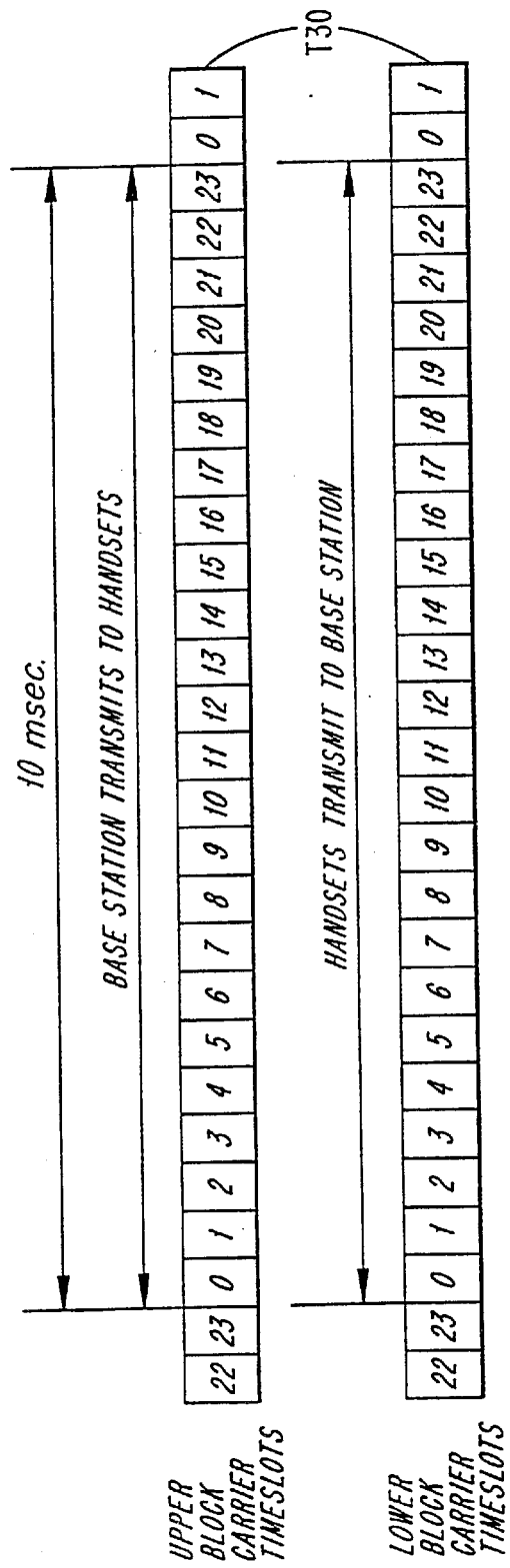
FIG. 3B depicts an exemplary time slot arrangement in a conventional time-division multiple-access/frequency-division duplex system.

By way of contrast, frequency-division duplex (FDD) systems require separate frequency bands for uplink and downlink communications. This results from the fact that the receive and transmit operations are executed simultaneously in time at different frequencies. A channel in a FDD system is thus defined by the frequency of operation. FIG. 3A depicts uplink and downlink communications between a conventional FDD base station B30 and a conventional FDD handset M30, and FIG. 3B shows an exemplary TDMA/FDD frame T30. Since both transmit and receive are accomplished simultaneously, separate hardware paths are required in both base stations and terminals. As a result, FDD systems are typically higher cost and consume more power as compared to conventional TDD systems. However, FDD systems provide relatively little cross-channel interference and are sometimes preferred from an inter-system perspective. In other words, a FDD scheme may be required to make a system compatible with proximate systems using an adjacent portion of the frequency spectrum. As a result, FDD systems have also been widely adopted in wireless communications applications.

Though both TDD and FDD systems do provide certain advantages, neither is ideally suited for all wireless communications applications. Further, as described above, the fundamental differences between TDD and FDD make it difficult to adapt a system configured specifically for one or the other to conform with a particular application need. Advantageously, however, the above incorporated copending applications Ser. Nos. 09/189,807 and 09/189,808 describe hybrid, frequency-time division duplex (FTDD) schemes which provide certain of the advantages of both types of conventional system and which further allow a single hardware configuration to be readily adapted to suit virtually any wireless communications application.

Copending application Ser. No. 09/189,808 provides a general, fully flexible channel definition for frequency-time division duplex, wherein any time slot within a TDMA/FTDD frame can be used for either uplink or downlink transmission. Additionally, copending application Ser. No. 09/189,807 provides certain advantages in terms of reduced hardware complexity and reduced software overhead by partitioning a TDMA/FTDD frame and reserving certain time slots within each frame for only one of either uplink or downlink transmission. Though certain aspects of the sectorization schemes of the present invention are applicaple to both forms of frequency-time division duplex, embodiments of the invention are, for sake of clarity, described hereinafter with respect to the frequency-time division duplex schemes of copending application Ser. No. 09/189,807 (i.e., schemes wherein TDMA/FTDD frames are partitioned and time slots reserved for either uplink or downlink transmission).

Figure 4A:
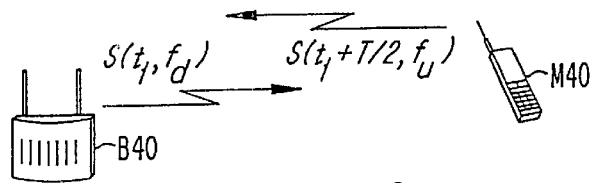
FIG. 4A depicts a base station and a terminal communicating in accordance with a time-division multiple-access/frequency-time division duplex scheme with which the sectorization techniques of the invention can be utilized.

FIG. 4A depicts a FTDD base station B40 and a FTDD handset M40 communicating according to the TDMA/FTDD schemes described in copending application Ser. No. 09/189,807. As shown, signals transmitted from the FTDD base station B40 to the FTDD handset M40, and those transmitted from the FTDD handset M40 to the FTDD base station B40, are separated in time and frequency.

Figure 4B:
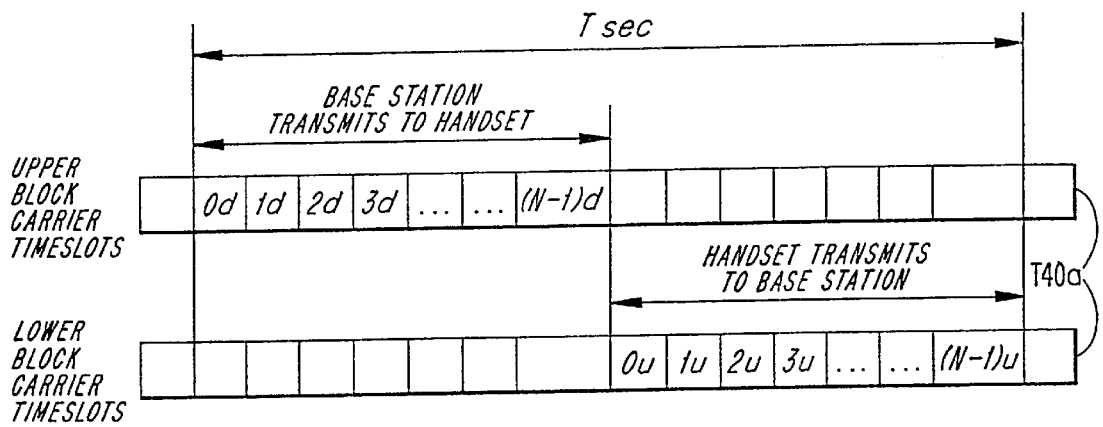
FIG. 4B depicts an exemplary time slot arrangement in a time-division multiple-access/frequency-time division duplex system in which the sectorization techniques of the invention can be implemented.
Figure 4C:
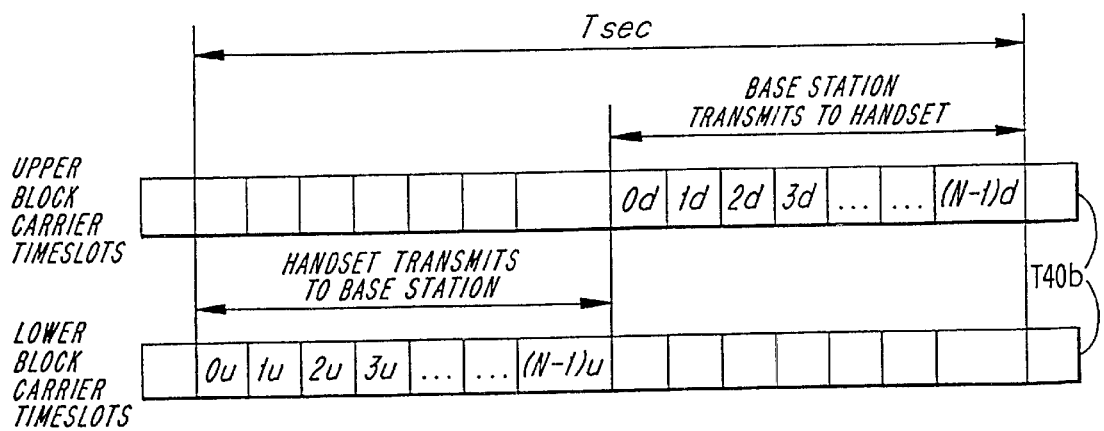
FIG. 4C depicts an alternative and complimentary time slot arrangement in a time-division multiple access/frequency-time division duplex system in which the sectorization techniques of the invention can be implemented.

Two exemplary channel definitions T40$a$, T40$b$ disclosed in copending application Ser. No. 09/189,807 are depicted in FIGS. 4B and 4C, respectively. Without loss of generality, a data frame for the channel definitions of FIGS. 4B and 4C is defined to include 2N time slots (N an integer). One half of the slots (i.e., a first N slots) are reserved for transmission from a base station to a portable, and the remaining half of the slots (i.e., a second N slots) are reserved for transmission from a portable to a base station. Assuming that the time durations of downlink and uplink slots are given by d and u, respectively, then the duration T of a single frame in the frequency-time division duplex scheme is given by T=N(d+u).

According to the channel definition T40a of FIG. 4B, an upper frequency band is reserved for base station to handset transmission, and a lower frequency is reserved for handset to base station transmission. Thus, the first N time slots in a frame are dedicated for downlink communication, and the second N time slots are dedicated for uplink communication. Conversely, according to the alternative and complimentary channel definition of FIG. 4C, the second N time slots are reserved for downlink communication, and the first N time slots are reserved for unpin communication. For the case in which the transmit and receive time slots are of the same duration (i.e., d=u), one half of the frame T, or T/2, is reserved for downlink signals and the remaining half is reserved for unpin signals. By colocating a first base station operating in accordance with the channel definition of FIG. 4B with a second base station operating in accordance with the channel definition of FIG. 4C, complete time and spectral efficiency can be provided for a particular coverage area. In other words, both frequencies in each TDMA time slot can be used for unpin or downlink transmission. Advantageously, the sectorization approaches of the present invention provide efficient mechanisms for achieving such time and spectral efficiency in practical systems.

To ensure that an overall system constructed according to FIGS. 4A, 4B and 4C operates properly, timing alignment among base stations is maintained. Specifically, individual base stations are time shifted with respect to a base reference. For example, a first group of base stations can employ zero offset so that they operate according to the channel definition of FIG. 4B, and another group of base stations can employ a half-frame offset (i.e., T/2) so that they operate according to the channel definition of FIG. 4C. Thus, unpin and downlink transmissions for the second group of base stations are offset by T/2 with respect to those of base stations in the first group. By combining one or more base stations from each group at common locations (e.g., according to the sectorization schemes of the present invention), efficiency in frequency and time can be acheived while maintaining full capacity for individual base stations.

Figure 5:
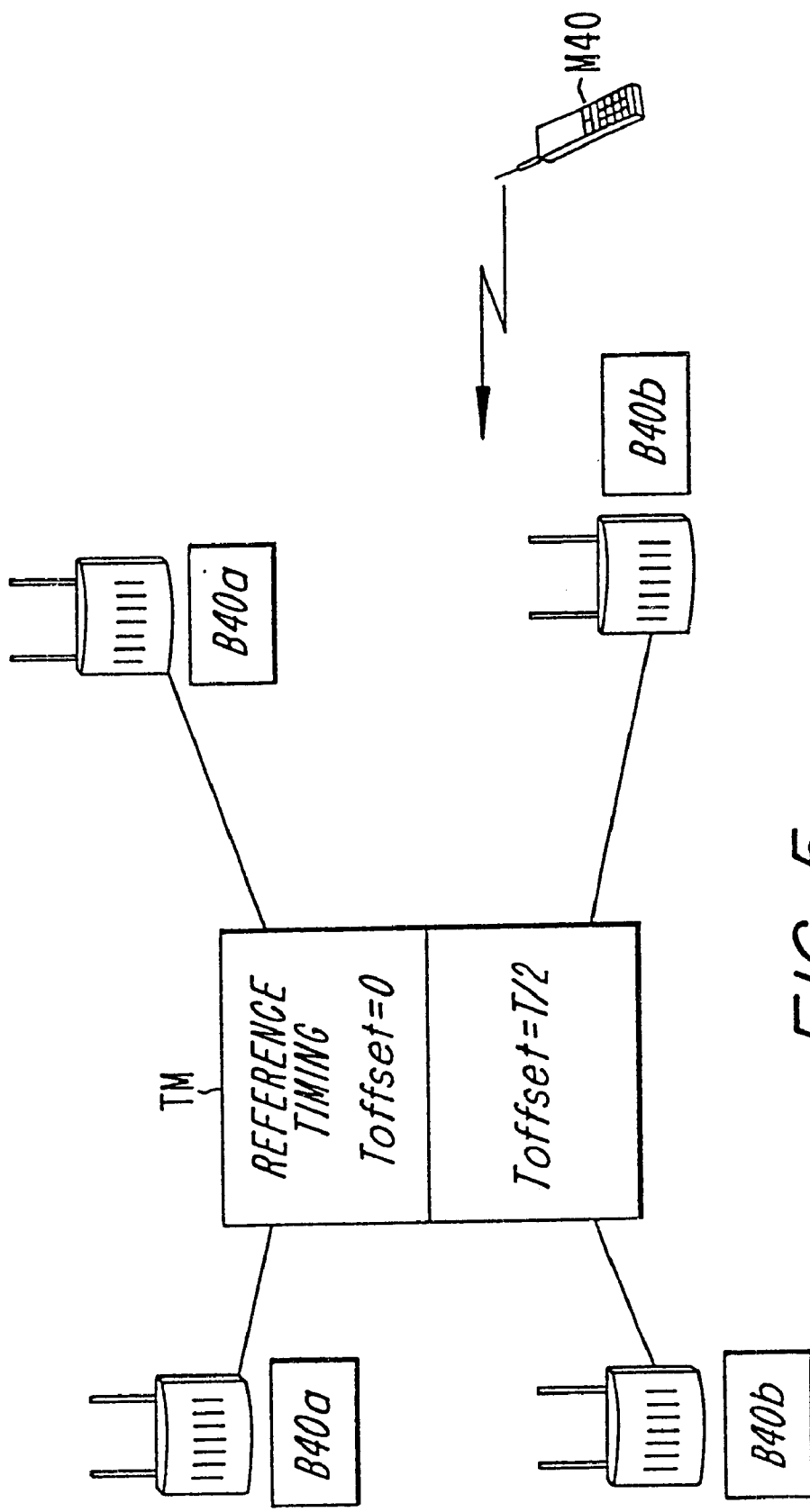
FIG. 5 depicts reference timing among two groups of base stations in an exemplary time-division multiple-access/frequency-time division duplex system in which the sectorization techniques of the invention can be implemented.

The above described timing relationship between base stations is depicted in FIG. 5. As shown, two starting moment reference clocks are offset by T/2. A first group of base stations B40a are connected to the base reference clock (zero offset), while a second group of base stations B40b are connected to the offset reference (T/2 offset). An additional offset is maintained at the network level to keep individual calls aligned. Thus, during FTDD operation (i.e., when separate unpin and downlink frequencies are used), the first group of base stations B40a operates in accordance with the channel definition of FIG. 4B, while the second group of base stations B40b operates in accordance with the channel definition of FIG. 4C. Accordingly, each base station can be classified as one of two types, A or B, depending upon which base reference it is connected to. For example, as shown in FIG. 6, each base station in the first group B40a can be considered a type A base station, while each base station in the second group B40b can be considered a type B base station.

Note that using a half-frame reference offset maintains slot synchronization between base stations, making synchronized communication with handsets possible for both groups of base stations. The resulting system thus maintains the capacity of individual base stations when operating in a time-division duplex mode, while allowing co-located base stations to recover full spectral and time efficiency when operating in a frequency-time division duplex mode.

Thus, with appropriate base station synchronization, it is possible for a handset to conduct communication with any base station in an overall system. Specifically, handsets need only adhere to the rule that time slots are paired with half-frame separation between unpin and downlink transmissions while independently maintaining simultaneous communications to both base station types. Thus, seamless handovers can be achieved between all base stations in an overall system. Those skilled in the art will appreciate that the above described timing can be achieved via straightforward software modification of existing systems.

Those skilled in the art will also appreciate that a system employing two groups of base stations with half-frame offset between groups is just one exemplary embodiment of the present invention. Generally, any number of base station groups can be used with appropriate fixed time-slot offsets between groups. For example, four groups of base stations can be implemented using quarter-frame offsets between groups. In such case, each group reserves one quarter of the time slots in each TDMA frame for unpin transmission and another one quarter of the time slots in each TDMA frame for downlink transmission. The frames are reserved for each group so that, at any moment in time, at most one group of base stations can transmit on the downlink frequency and at most one group of base stations can receive on the unpin frequency. Thus, four co-located base stations, one from each of the four groups, can provide full time and spectral efficiency for a particular coverage area.

Note that the time slots reserved for unpin and downlink transmission for a particular type of base station need not be consecutive time slots within a TDMA frame. For example, in a two-group system such as that depicted in FIGS. 4B, 4C and 5, the first group of base stations can reserve even numbered time slots for downlink communication and odd numbered time slots for unpin communication, while the second complimentary group of base stations reserves odd numbered time slots for downlink communication and even numbered time slots for unpin communications. Those skilled in the art will immediately appreciate that every possible combination of complimentary time slot arrangement is contemplated herein. It is only important that, once a particular partition of time slots is reserved for unpin or downlink transmission by one group of base stations, the time slots in that particular partition cannot be also be used for the same type of transmission by another group of base stations. Indeed, the time slots reserved for unpin and downlink transmission for each base station group can be randomly distributed throughout the TDMA frames.

As noted above, since unpin and downlink transmissions occur at separate times, a system utilizing the above described FTDD scheme can be constructed so that the transmit and receive paths in both a base station and a terminal are shared as in a conventional time-division duplex system. As a result, such a system provides the advantages of relatively low cost and low power consumption. This feature of frequency-time division duplex systems is described in detail in the above incorporated copending applications Ser. Nos. 09/189,807 and 09/189,807.

Though the above described frequency-time division duplex scheme is not a true frequency-division duplex system, in that transmission and reception are not conducted simultaneously, the frequency-time division duplex scheme nonetheless appears to proximate systems as a frequency-division duplex scheme from the perspective of intersystem interference. Thus, a system utilizing the frequency-time division duplex scheme can be implemented in contexts where a frequency-division duplex scheme is preferred. Furthermore, hardware configured to implement the frequency-time division scheme can also be utilized where time-division duplex is preferred. In other words, a simple software change can be used to shift one or both of the unpin and downlink frequencies (i.e., by changing the frequencies of the local oscillators used to generate the corresponding carriers) so that the unpin and downlink frequencies are the same and the system operates as a true time-division duplex system.

Thus, a time-division multiple-access system constructed in accordance with the above described frequency-time division duplex techniques can be easily configured to use either a time-division duplex scheme or a pseudo frequency-division duplex scheme. Furthermore, a system originally configured to use time-division duplex can be easily converted to use frequency-division duplex, and vice versa, as needs change. Advantageously, such conversions can be accomplished quickly and inexpensively without architecture modification.

As noted above, two or more base stations of each time-offset type can be co-located to cover all possible time slots within a particular coverage area or cell. For example, two co-located base stations (one of type A and one of type B) having omni-directional antennas (i.e., providing 360-degree coverage) can cover all possible time slots within an area surrounding the co-located base stations. Additionally, the present invention provides a number of efficient sectorization techniques in which a number of base stations are co-located, at least some of the base stations using frequency-time division duplex transceivers of each time reference type (e.g., A and B), so that a duplex link can be set up anywhere within the coverage area during any time slot. Advantageously, each sectorization technique provides a particular degree of adjacent sector interference immunity.

According to a first embodiment, each base station in a cluster of base stations services an independent coverage sector such that the cluster as a whole completes a 360-degree coverage area. According to the embodiment, antenna sectors are independent to the limit that adjacent sector coverage angles overlap, in most applications, by 25–100%. When all of the base stations in the cluster are of the same time reference type (e.g., type A), half of all possible duplex links are supported by the cluster at any point in the coverage area. Advantageously, a duplicate co-located base station cluster can then use the alternate base station type (e.g., type B) to cover the remaining possible duplex links within the same coverage area. Since the second (type B) cluster operates in the opposing time frame reference, it does not interfere with the first (type A) cluster.

An example of the above described sector arrangement is depicted in FIG. 7, wherein coverage sectors 70a of a first cluster of six type A base stations (each type A base station having a directional antenna and providing approximately 60-degree coverage with possible overlap as described above) coincide with coverage sectors 70b of a co-located cluster of six type B base stations (each type B base station also having a directional antenna and providing approximately 60-degree coverage with possible overlap). While such an arrangement does provide coverage for all duplex links within the coverage area surrounding the co-located base station clusters, it does not necessarily optimally reduce adjacent sector interference. In other words, since adjacent (possibly overlapping) coverage sectors of each base station cluster use the same time frame reference for transmission and reception, each coverage sector can potentially introduce interference from out of band emissions into its neighboring coverage sectors of the same type. Further, the arrangement of FIG. 7 requires two base station clusters to cover all time slots within the coverage area.

An alternative embodiment according to the invention provides improved interference immunity between neighboring sectors within a cluster. According to the embodiment, the coverage area of each sector within a cluster is increased while the antenna opening angle of the base station serving each sector is maintained. As a result, the overlap of antenna patterns within the cluster is minimized, and neighboring interference within the cluster is reduced.

An overall coverage area surrounding the cluster is then completed using a second co-located base station cluster of opposite time reference type. For example, the second cluster can be designed in the same manner as the first cluster with respect to sector size and antenna opening angle, but can use type B base stations where the first cluster uses type A base stations, or vice versa. To guarantee complete coverage by at least one base station type, the second cluster can be oriented such that its sectors are at an offset angle of one-half the antenna opening angle relative to the sectors of the first cluster. An example of such a configuration is depicted in FIG. 8, wherein 120-degree coverage sectors 80a of a first cluster of three type A base stations (each having an antenna opening angle of less than 120 degrees) are azimuthally offset (by 60 degrees in the figure) with respect to coverage sectors 80b of a co-located cluster of three type B base stations (each also having an antenna opening angle of less than 120 degrees).

Figure 9:
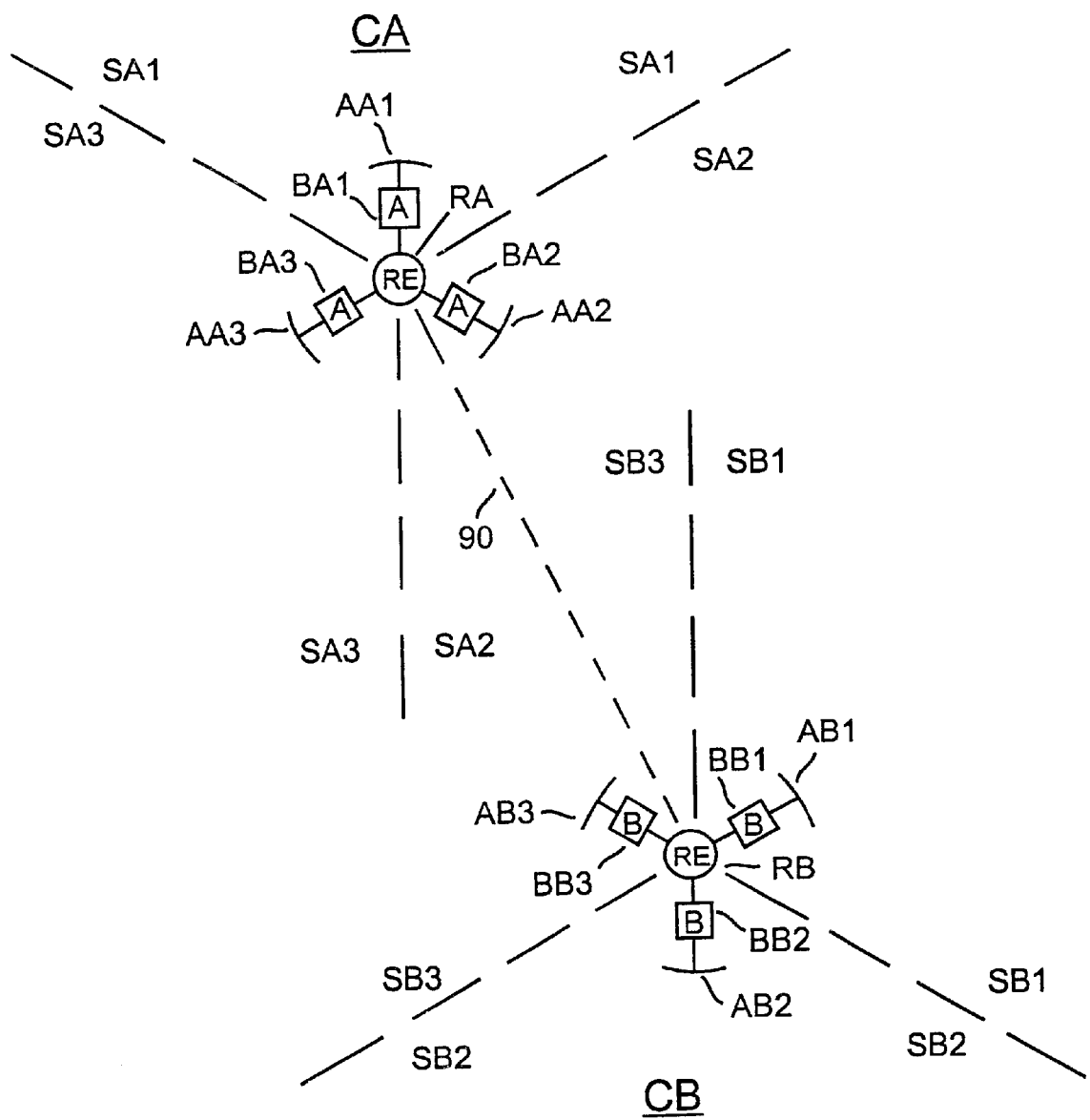
FIG. 9 depicts an exemplary hardware configuration used, for example, to implement the frequency-time division duplex schemes of FIGS. 7 and 8.

FIG. 9 depicts an exemplary hardware configuration which can be used to implement the sectorization scheme of FIG. 8. As shown, a first base station cluster CA is co-located with a second base station cluster CB (as indicated by a dashed line 90 in the figure). The first base station cluster CA includes a first radio exchange RA controlling three type A base stations BA1, BA2, BA3, each type A base station being coupled to one of three directional antennae AA1, AA2, AA3, respectively. Similarly, the second base station cluster CB includes a second radio exchange RB controlling three type B base stations BB1, BB2, BB3, each type B base station being coupled to one of three directional antennae AB1, AB2, AB3, respectively.

In operation, the three type A base stations provide coverage to three nonoverlapping type A coverage sectors SA1, SA2, SA3, respectively, and the three type B base stations provide coverage to three non-overlapping type B coverage sectors SB1, SB2, SB3, respectively. As shown, the type A sectors SA1, SA2, SA3 are azimuthally offset by 60 degrees with respect to the type B sectors SB1, SB2, SB3 to guarantee complete coverage (i.e., to ensure that transition regions between same-type sectors fall well within a sector of the opposite type).

Those of skill in the art will appreciate that the arrangement of components in FIG. 9 is for illustrative purposes and that, in practice, the components can arranged in other ways. For example, although each base station is shown as a separate component, each base station within a cluster can be housed in a single chassis (with or without the controlling radio exchange), and although each base station is shown oriented toward the center of a sector, it is the antenna orientation and not the physical position of the base station that determines sector shape and direction. Further, although the antennae for each cluster are shown as separate components, they can instead be partitions of a single antenna array.

Note also that the number of base stations per cluster is a matter of design choice and that each cluster can thus include any number of base stations (e.g., six base stations providing service for 60-degree sectors within each cluster as in FIG. 7). Moreover, only two types of base station cluster are shown for sake of clarity, and more than two types of base station cluster can be co-located in practice. For example, three co-located clusters, types A, B and C, can include four base stations each. In such case, each base station can serve a 90-degree sector, and each sector can be offset 30 degrees with respect to a sector of each other type so that mobile stations should always have access to one base station of each of the three types (and are guaranteed to have access to at least two base station types, even at the transition regions between sectors of like type).

Another sectorization technique according to the invention combines two or more base station types (e.g., types A and B) in an alternating fashion within a single base station cluster. An example of such a configuration is depicted FIG. 10, wherein an overall coverage area of a single base station cluster includes three type A sectors 10a interleaved with three type B sectors 10b. Though the sectors are shown as non-overlapping, those of skill will appreciate that the A type sectors extend into the B type sectors, and vice versa, so that each subset of like base stations (i.e., the subset of three A type base stations and the subset of three type B base stations) provides complete 360-degree coverage. Thus, like the arrangement of FIG. 8, the arrangement of FIG. 10 makes all time slots on both frequencies available to mobile stations throughout the overall coverage area. Furthermore, multiple clusters can be combined in a complimentary fashion by physically orienting each cluster using a common reference direction as shown in FIG. 11. By doing so, the entire extended coverage area of a wireless communications system can benefit from the non-interfering neighbor configuration, and coverage of all possible duplex links at any point within the extended coverage area is provided by a single base station cluster.

Figure 10:
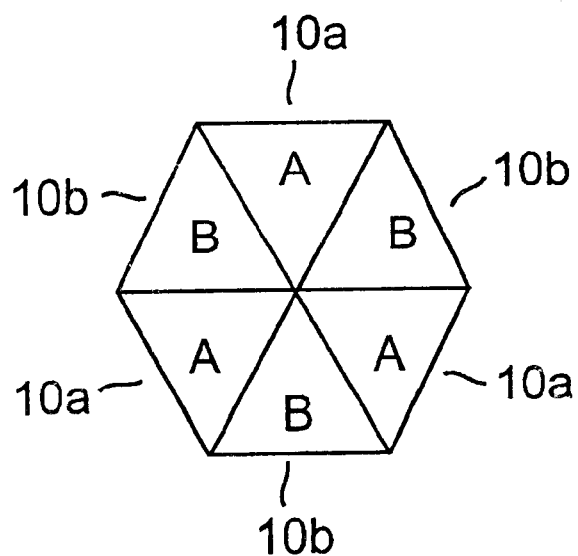
FIG. 10 depicts a third exemplary frequency-time division duplex sectorization approach according to the invention.
Figure 11:
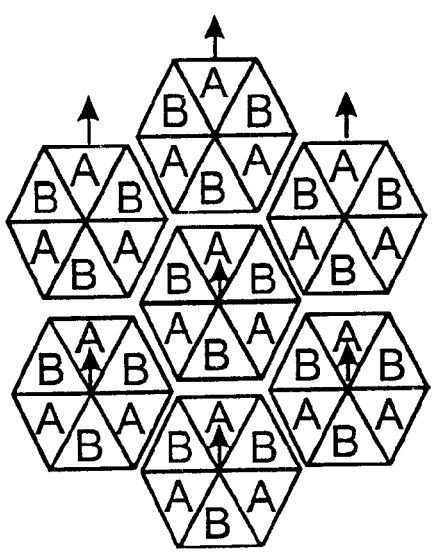
FIG. 11 depicts a fourth exemplary frequency-time division duplex sectorization approach according to the invention.
Figure 12:
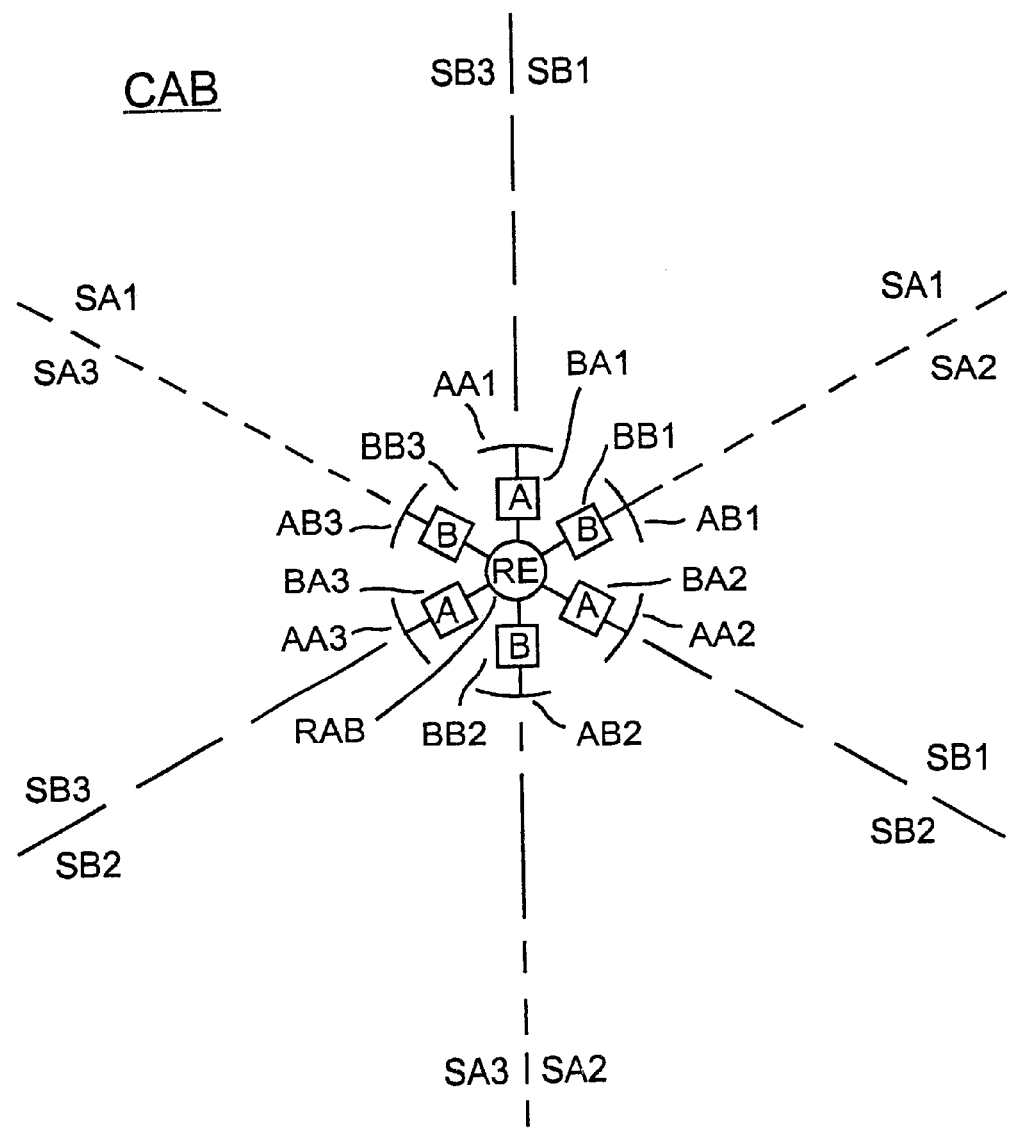
FIG. 12 depicts an exemplary hardware configuration used, for example, to implement the frequency-time division duplex schemes of FIGS. 10 and 11.

FIG. 12 depicts an exemplary hardware configuration which can be used to implement the sectorization schemes of FIGS. 10 and 11. As shown, an exemplary base station cluster CAB includes a radio exchange RAB controlling three type A base stations BA1, BA2, BA3 (each coupled to one of three directional antennae AA1, AA2, AA3, respectively) and three type B base stations BB1, BB2, BB3 (each coupled to one of three additional directional antennae AB1, AB2, AB3, respectively). In operation, the three type A base stations provide coverage to three non-overlapping type A coverage sectors SA1, SA2, SA3, respectively, and the three type B base stations provide coverage to three non-overlapping type B coverage sectors SB1, SB2, SB3, respectively.

As shown, the type A sectors SA1, SA2, SA3 are azimuthally offset by 60 degrees with respect to the type B sectors SB1, SB2, SB3 and ensure that transition regions between same-type sectors fall well within a sector of the opposite type as in the system of FIG. 9. Indeed, note that the systems of FIGS. 9 and 12 are functionally identical from the perspective of mobile stations. However, whereas two co-located homogeneous clusters CA, CB are used in the system of FIG. 9, a single hybrid cluster CAB is used in the system of FIG. 12. Which system is used in practice is a matter of design choice (e.g., depending upon designer preference for construction the radio exchanges in the system). Those of skill will appreciate that, as in FIG. 9, the number of sectors and the positioning and layout of the components of FIG. 10 are for illustrative purposes only, and that numerous other configurations are contemplated herein.

Generally, the present invention provides efficient sectorization methods for frequency-time duplex communications systems. According to exemplary embodiments, a number of clustered base stations are configured using frequency-time division duplex transceivers of at least two time reference types so that a duplex link can be set up anywhere within a coverage area of the clusters during any time slot. Those skilled in the art will appreciate that the present invention is not limited to the specific exemplary embodiments which have been described herein for purposes of illustration and that numerous alternative embodiments are also contemplated. The scope of the invention is therefore defined by the claims appended hereto, rather than the foregoing description, and all equivalents which are consistent with the meaning of the claims are intended to be embraced therein.

What is claimed is:

1. A base station cluster for use in a wireless communications system, comprising:

a number of base stations, each base station being configured to communicate with mobile stations in said wireless communications system and in accordance with a time division multiple access/frequency-time division duplex (TDMA/FTDD) communications format; and an equal number of antennae, each antenna being coupled to a different one of said base stations and oriented such that each of said base stations communicates with mobile stations located in a sector of a coverage area of said base station cluster, wherein information signals are communicated between said base stations and mobile stations via TDMA frames, each TDMA frame including first and second time slot partitions, wherein each of a first subset of said base stations uses the first partition of each TDMA frame exclusively for transmission of information signals to mobile stations and uses the second partition of each TDMA frame exclusively for reception of information signals from mobile stations, and wherein a second subset of said base stations uses the first partition of each TDMA frame exclusively for reception of information signals from mobile stations and uses the second partition of each TDMA frame exclusively for transmission of information signals to mobile stations.

2. A base station cluster according to claim 1, further comprising a radio exchange coupled to each of said base stations and configured to provide timing and control signaling for each of said base stations.

3. A base station cluster according to claim 1, wherein the coverage area is an area surrounding said base station cluster.

4. A base station cluster according to claim 1, wherein an azimuthal extent of each sector of the coverage area is determined by an opening angle of one of said antennae.

5. A base station cluster according to claim 4, wherein the coverage area is an area surrounding said base station cluster, wherein the number of said base stations is an integer N greater than or equal to 2, and wherein the opening angle of each of said antennae is less than 360/N degrees.

6. A base station cluster according to claim 1, wherein information signals are communicated between said base stations and mobile stations via TDMA frames, each TDMA frame including first and second time slot partitions, wherein each base station uses the first partition of each TDMA frame exclusively for transmission of information signals to mobile stations and uses the second partition of each TDMA frame exclusively for reception of information signals from mobile stations.

7. A base station cluster according to claim 6, wherein each time slot in the first partition of each frame occurs earlier in time than each time slot in the second partition of each frame.

8. A base station cluster according to claim 6, wherein each time slot in the first partition of each frame occurs later in time than each time slot in the second partition of each frame.

9. A base station cluster according to claim 6, wherein time slots of the first partition of each frame are interleaved with time slots of the second partition of each frame.

10. A base station cluster according to claim 1, wherein said antennae are oriented such that sectors serviced by base stations of the same subset are separated by at least one sector serviced by a base station of the other subset.

11. A base station cluster according to claim 1, wherein each time slot in the first partition of each frame occurs earlier in time than each time slot in the second partition of each frame.

12. A base station cluster according to claim 1, wherein time slots of the first partition of each frame are interleaved in time with time slots of the second partition of each frame.

13. A wireless communications system having an overall coverage area including a plurality of cells, comprising:
at least one base station cluster positioned within one of said cells, each base station cluster including
a number of base stations, each base station being configured to communicate with mobile stations in said wireless communications system and in accordance with a time division multiple access/frequency-time division duplex (TDMA/FTDD) communications format, and
an equal number of antennae, each antenna being coupled to a different one of said base stations and oriented such that each of said base stations communicates with mobile stations located in a sector of said one cell, wherein first and second base station clusters are co-located in said one cell, and information signals are communicated between base stations and mobile stations via TDMA frames, each TDMA frame including first and second time slot partitions,
wherein each base station in said first base station cluster uses the first partition of each TDMA frame exclusively for transmission of information signals to mobile stations and uses the second partition of each TDMA frame exclusively for reception of information signals from mobile stations, and
wherein each base station in said second base station cluster uses the first partition of each TDMA frame exclusively for reception of information signals from mobile stations and uses the second partition of each TDMA frame exclusively for transmission of information signals to mobile stations.

14. A wireless communications system according to claim 13, wherein antennae of said first and second base station clusters are oriented such that sectors serviced by said first base station cluster are offset with respect to sectors serviced by said second base station cluster.

15. A wireless communications system according to claim 13, wherein a single base station cluster is located in said one cell,
wherein information signals are communicated between base stations and mobile stations via TDMA frames, each TDMA frame including first and second time slot partitions,
wherein each of a first subset of base stations in said single base station cluster uses the first partition of each TDMA frame exclusively for transmission of information signals to mobile stations and uses the second partition of each TDMA frame exclusively for reception of information signals from mobile stations, and
wherein each of a second subset of base stations in said single base station cluster uses the first partition of each TDMA frame exclusively for reception of information signals from mobile stations and uses the second partition of each TDMA frame exclusively for transmission of information signals to mobile stations.

16. A wireless communications system according to claim 15, wherein antennae of said single base station cluster are oriented such that sectors serviced by said first subset of base stations are offset with respect to sectors serviced by said second subset of base stations.

17. A wireless communications system according to claim 15, wherein antennae coupled to base stations in said first subset of base stations are interleaved with antennae coupled to base station in said second set of base stations to provide interference separation between sectors.

18. A wireless communications system according to claim 16, further comprising a number of additional base station clusters, one of said additional base station clusters being positioned in each one of an equal number of additional cells of said system, wherein sectors of each additional base station cluster are aligned with the sectors of said single base station cluster to provide interference separation for every sector in said system.

19. A method of wireless communication, comprising the steps of:
communicating signals, via a frequency-time division duplex communications format, between base stations and mobile stations within a first sector of a coverage area of a wireless communications system; and
communicating signals, via a complementary frequency-time division duplex communications format, between base stations and mobile stations within a second sector of a coverage area of the wireless communications system.

* * * * *

UNITED STATES PATENT AND TRADEMARK OFFICE
CERTIFICATE OF CORRECTION

PATENT NO. : 6,556,830 B1
DATED : April 29, 2003
INVENTOR(S) : Michael J. Lenzo

It is certified that error appears in the above-identified patent and that said Letters Patent is hereby corrected as shown below:

<u>Title page,</u>
Please insert the following item:
-- [*] Notice: This patent is subject to a terminal disclaimer. --

Signed and Sealed this

Eighteenth Day of November, 2003

JAMES E. ROGAN
*Director of the United States Patent and Trademark Office*